United States Patent [19]

Shuford

[11] Patent Number: 5,518,816
[45] Date of Patent: May 21, 1996

[54] COMPOSITION AND METHOD FOR FORMING A PROTECTIVE COATING ON CARBON-CARBON CHEMICAL VAPOR DEPOSITION DENSIFIED SUBSTRATES

[75] Inventor: David M. Shuford, Albuquerque, N. Mex.

[73] Assignee: Loral Vought Systems Corporation, Grand Prairie, Tex.

[21] Appl. No.: 531,944

[22] Filed: Sep. 13, 1983

Related U.S. Application Data

[63] Continuation-in-part of Ser. No. 453,930, Dec. 28, 1982, Pat. No. 4,465,777, which is a continuation of Ser. No. 252,117, Apr. 8, 1981, abandoned.

[51] Int. Cl.$^6$ ........................................... B32B 9/00
[52] U.S. Cl. ..................... 428/408; 427/419.7; 501/88; 501/154
[58] Field of Search .................... 427/419.7; 428/408; 501/88, 154

[56] References Cited

U.S. PATENT DOCUMENTS

| | | | |
|---|---|---|---|
| 3,947,550 | 3/1976 | Fitchmun | 501/88 |
| 3,960,577 | 6/1976 | Prochazka | 501/88 |
| 4,080,415 | 3/1978 | Coppola et al. | 501/88 |

OTHER PUBLICATIONS

Donald M. Curry et al.: "Material Characteristics of Space Shuttle Reinforced Carbon–Carbon", pp. 1524–1534 & 1538, Apr. 1973.

Donald C. Rogers et al.: "Material Development Aspects of an Oxidation Protection System for a Reinforced Carbon-–Carbon Composite", pp. 308–337.

Donald C. Rogers et al.: "Formation Mechanism of a Silicon Carbide Coating for a Reinforced Carbon–Carbon Composite", pp. 319–336.

Primary Examiner—Richard D. Lovering
Attorney, Agent, or Firm—Richards, Medlock & Andrews

[57] ABSTRACT

In accordance with the invention, a composition of matter is provided for forming a coating for protecting carbonaceous substrates from degradation at elevated temperatures. The composition is a mixture of particulate silicon, silicon carbide and boron. The mixture contains between about 25% and 40% silicon by weight of the total composition, between about 50% and 70% by weight silicon carbide by weight of the total composition, between about 1% and 15% boron by way of the total composition and a minor amount of magnesium. The compositions can be used in a method for forming a primary protective coating on carbonaceous substrates including, in particular, reinforced carbon-carbon materials produced using chemical vapor deposition techniques.

17 Claims, No Drawings

COMPOSITION AND METHOD FOR FORMING A PROTECTIVE COATING ON CARBON-CARBON CHEMICAL VAPOR DEPOSITION DENSIFIED SUBSTRATES

RELATED APPLICATION

This application is a continuation-in-part of U.S. application Ser. No. 453,930, filed Dec. 28, 1982, now U.S. Pat. No. 4,465,777, as a continuation of U.S. application Ser. No. 252,117, filed Apr. 8, 1981, now abandoned.

TECHNICAL FIELD

This invention relates to the protection of carbon and graphite materials from degradation at elevated temperatures. More particularly, the invention relates to the protection of reinforced carbon-carbon composite substrate materials, utilizing a composition of matter containing boron, silicon carbide and silicon for forming a protective coating that protects the substrate from degradation at elevated temperatures in oxygen containing environments.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. Carbon-carbon composite substrates are also produced through use of chemical vapor deposition techniques to deposit a carbon matrix in the carbon fibers. These "CVD" type carbon-carbon composite substrates can be denser than materials densified through liquid impregnation techniques. Substrates densified using a combination of resin impregnation and chemical vapor deposition techniques can also be produced.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a composition of matter and method for forming protective coatings on graphite and carbon materials, and especially for reinforced carbon-carbon composite materials.

One indication of high temperature degradation resistance is the percent weight change of the coated substrate or part that is exhibited over a period of exposure in an elevated temperature environment containing oxygen. It is desirable for a coated substrate not to exhibit a significant weight change after exposure to high temperatures in oxygen containing environments since this could affect the performance of the device incorporating such materials.

Accordingly, a need exists for a method and composition of matter for forming a protective coating on carbon substrates that provides resistance to degradation at elevated temperatures of up to about 3000° F. Further, a need exists for a method and composition of matter for forming a protective coating on reinforced carbon-carbon composite substrates wherein protection from degradation is provided at elevated temperatures where temperature cycling frequently occurs, thereby subjecting the substrate to varying temperatures between about 3000° F. and below 0° F.

DISCLOSURE OF THE INVENTION

In accordance with the present invention, a composition and method is provided for forming a primary protective coating on carbonaceous substrate materials. The primary coatings formed in accordance with the method and composition of the present invention exhibit excellent protection from oxidation and degradation at temperatures between about 2500° F. and 3000° F. in oxygen containing environments.

The coatings disclosed hereinbelow have been found to be particularly useful in providing oxidation resistance to substrates densified using chemical vapor deposition techniques. Basically, the CVD process for densifying porous graphite fiber composites consists of reacting volatile compounds at a surface that has been heated to a sufficient temperature such that the compounds decompose and deposit a carbon coating. The by-products are pumped away, flushed off in a stream of carrier gas, or removed by reacting with some suitable material in the system. Conventionally, the equipment required for infiltrating the substrate with CVD carbon consists of a metering system for controlling the flow of gasses, a porous substrate which is to be densified, a graphite tube furnace or some means for heating the porous substrate, and a throttling valve and vacuum pump for maintaining the desired pressure. The basic chemical reaction describing the formation of CVD carbon from methane is simply the decomposition of methane to carbon and hydrogen. There are three basic techniques for infiltration with CVD carbon. The first technique involves passing a carbon bearing gas at moderately low pressures over the surface of the heated porous substrate. A carbon bearing gas diffuses into the structure and deposits carbon within the pores. In the second technique, a differential pressure is established across the thickness of the porous material and the carbon source gas is forced to flow through the porous structure. The differential pressure serves as the driving force for infiltration. The third technique, like the first, is diffusion controlled. It differs in that a temperature differential is established across the thickness of the substrate and the carbon-bearing gas is passed over the lower-temperature surface. This technique minimizes the deposition of a surface coating by keeping the surface temperature below the threshold pyrolysis temperature of the carbon-bearing gas. Carbon-carbon substrate materials produced using one of these CVD techniques can generally achieve higher densities than can easily be obtained using multiple resin impregnations. Higher densities, while desirable from the viewpoint of strength of the material, generally increase the difficulty of forming an oxidation resistant coating thereon. The method and composition for coating carbon-carbon substrates disclosed hereinbelow has been demonstrated to be particularly useful in this regard.

Broadly stated, the composition for forming a primary protective coating on carbonaceous substrate materials comprises between about 25% and 40% particulate silicon by weight of the total composition, between about 50% and 70% particulate silicon carbide by weight of the total composition and between about 1% and 15% of particulate boron by weight of the total composition. The composition should also include a-minor amount of magnesium. Magnesium is generally present as an impurity in technical grade particulate boron in sufficient quantity.

In accordance with the method of the present invention, a primary protective coating is formed on carbonaceous substrate materials for protecting the material from degradation at elevated temperatures that comprises forming an essentially uniform mixture of particulate silicon, silicon carbide and boron in the range of the aforesaid composition, together with a minor amount of magnesium. The material that is to be coated is encased in a release agent that is a carbonaceous material, such as filter paper, that is preferably free of metallic impurities. The encased substrate is contacted with the aforesaid mixture. Thereafter, the encased substrate and mixture is heated and maintained between about 3175° F. and 3350° F. in an inert atmosphere for a period of time sufficient to form a coating of the desired thickness on the surface of the substrate from the mixture. The encased substrate is maintained in contact with the mixture during heating. Generally, the encased substrate and mixture will be heated for a period of between about 4 and 7 hours to form the primary coating that is usually between about 5 and 30 mils thick. The thickness of the primary coating obtained depends on several factors, including the time-temperature profile (TTP), the concentration of components and the type of substrate material.

The primary coating is useful for protecting the substrate material from degradation at temperatures between about 2500° F. and 3000° F. in air.

In applications where the coated substrate will be exposed to cyclic temperatures, in which temperatures lower than 2500° F. are also encountered, an enhancement coating is applied to the primary coating. The combination of the primary coating formed from the particulate silicon, silicon carbide and boron mixture with the enhancement coating results in a protective coating that provides protection from degradation at cyclic temperatures that range between about −300° F. and 3000° F.

In one embodiment, the enhancement coating is formed by impregnating the primary coating with tetraethyl orthosilicate. The tetraethyl orthosilicate is then heat cured on the primary coating forming a silica coating. Thereafter, a slurry of an alkali silicate liquid and silicon carbide powder is applied to the surface and heat cured. Alternatively, a mixture of water, sodium borate and sodium silicate can be substituted for the liquid alkali silicate of the slurry. Finally a sealing coat of the liquid component of the slurry without silicon carbide powder is applied and heat cured.

In accordance with another embodiment of the enhancement coating, a monoaluminum phosphate solution containing alumina and silicon carbide is applied to the surface of the primary coating and is thereafter heat cured.

The enhancement coating has the effect of sealing the primary coating, thereby preventing direct exposure of the substrate to the atmosphere when temperature cycling occurs, which causes the primary coating to expand and to contract. A substrate having the primary coating and the enhancement coating can be subjected to temperature cycling in which temperatures as high as about 3000° F. and as low as −300° F. are attained in oxygen containing environments without significant detrimental effects to the substrate.

DETAILED DESCRIPTION

The primary coating is useful for protecting carbonaceous substrates from degradation at sustained temperatures of between about 2500° F. and 3000° F. without additional protective coatings.

The compositions for forming the primary coating in accordance with the invention contain between about 25% and 40% particulate silicon by weight of the total composition, between about 50% and 70% particulate silicon carbide by weight of the total composition and between about 1% and 15% particulate boron by weight of the total composition. In a preferred embodiment, the composition comprises about 35% by weight silicon, about 60% by weight silicon carbide and about 5% by weight boron. Minor amounts of magnesium should also be present. Generally, technical grade boron contains magnesium as an impurity in a sufficient amount for purposes of the invention. Technical grade boron generally contains between about 8–10% by weight impurities, most of which is magnesium. The magnesium facilities formation of the primary coating on the substrate. Generally, between about 2–8% magnesium is preferred and about 4% magnesium by weight of the boron is most preferred in the composition for forming the primary coating. Preferably, particulate amorphous boron is utilized and one preferred type can be obtained from the Kerr McGee Company, a corporation of the State of Delaware, sold under the trade designation "Trona" which contains about 90% to 92% by weight of particulate boron with the remainder containing impurities of which magnesium is the major impurity. While understanding the function of the magnesium is not essential to practicing the invention, it is believed that the magnesium present in the boron acts as a fluxing agent facilitating formation of the primary coating.

Preferably, the particle size of the three components are as follows: silicon-about 325 Tyler standard screen scale; boron-between about 0.5 and 20 microns; and silicon carbide-between about 4.5 and 20.5 microns.

The most preferred type of silicon carbide is sold under the trade designation "RA 1200, Class 1-green grit" by the Carborundum Company, a corporation of the State of Delaware.

In utilizing the composition in accordance with the present invention, the components are mixed together to form a uniform mixture. In order to form the primary protective coating, the mixture is brought into contact with a release agent that encases the substrate. The release agent is a carbonaceous material that is preferably free of metallic impurities and encloses the substrate. The release agent may be, for example, ash free paper. Preferably, the release agent is a combination of ash free filter paper and filter paper pulp that is applied with a binder material, such as hydroxypropyl methyl cellulose. A preferred type of hydroxypropyl methyl cellulose is sold by the Dow Chemical Company of Midland, Michigan under the tradename "Methocel." The use of the filter paper in combination with filter paper pulp and binder solution allows the substrate to be easily encased by the release agent. The release agent facilitates removal of the substrate from the mixture after the primary coating has been formed. When a binder, such as hydroxypropyl methyl cellulose is utilized, the release agent is heated generally between about 200° F. and 400° F. to dry and cure the binder. After the release agent encloses substrate, the mixture is brought into contact with the encased substrate. Generally, the entire substrate or part will be encased by the mixture resulting in a protective coating on the entire surface of the substrate.

Preferably, the encased substrate to be coated having the release agent thereon is placed in a graphite retort or other container that is capable of withstanding very high temperatures. The mixture is uniformly packed around the substrate so that the mixture completely encases the substrate. Most preferably, the compaction of the mixture is tested for surface compaction. It is preferred that the surface compaction unconfined strength be between about 5.0 and 6.0 tons/ft$^2$, which can be measured on a soil tester sold by Soil Test Inc. of Chicago, Ill., Model No. CL 700, which is used with a probe of circular cross section, one-half inch in diameter and is inserted to a depth of one-quarter inch into mixture.

As an alternative to packing the mixture, for completely encasing the substrate with the mixture, a slurry of the composition and a carrier liquid can be utilized in which the slurry encases the substrate having the release agent thereon. Suitable carrier liquids include water, isopropyl alcohol and mixtures thereof, for example.

In packing the substrate in the composition, it is advantageous to provide parting planes for facilitating removal of the substrate after the coating is formed, since the compositions tend to solidify into a hard mass after heating. Parting planes can be provided by dividing the volume of composition into separate quadrants, utilizing a carbonaceous material such as paper, preferably ash free filter paper.

Generally, a weight is placed upon the unconfined surface of the mixture to help maintain contact between the mixture and the encased substrate, since the carbonaceous material used as a release agent which encases the substrate degrades upon heating.

After the composition encases the substrate and release agent, the composition is dried under vacuum. Thereafter, the graphite retort containing the mixture and substrate is placed in an inert atmosphere. Preferably, an argon gas atmosphere is utilized, at a pressure of about 3 psi (gauge). The graphite retort and its contents are then heated to form the coating. The furnaces used for heating to produce the protective coating generally have graphite resistance tubes as heating elements or use graphite receptors which are heated by induction. The retorts are then heated by radiation.

Generally, the retort and its contents are heated in the range of between about 3175° F. and 3350° F. for a period of time sufficient to form the protective coating of a desired thickness. For liquid impregnated carbon-carbon substrates, it is generally preferred to first heat the retort and its contents to about 2800° F. to facilitate attainment of a desired temperature. Thereafter, the retort and its contents are maintained at a temperature of about 3100° F. and is maintained for about two hours. Then, the retort and its contents are heated so that a temperature of about 3300° F. is maintained for two hours. The retort and its contents are then cooled. Generally, cooling is accomplished by turning off power to the furnace. The foregoing described step-heating process is preferred because a more uniform coating results than if the retort and its contents were maintained at a fixed temperature. Generally, the four hour step-heating process as previously described produces a primary coating that is between about 5 and 10 mils thick.

When CVD carbon-carbon substrates are to be coated the above procedure can be utilized. However, it has been found to be desirable to use a specific type of release agent and to adjust the curing temperature. The use of graphite felt has been found to be particularly useful in coating CVD type carbon-carbon substrates. Preferred graphite felt for this use is WDF graphite felt (Union Carbide) split in ½ to reduce thickness—about ⅛" thick. Filter paper and filter pulp with binders can also be used but are not as desirable as the felt when coating these CVD materials. Further the preferred curing temperature for forming the coating on these types of substrates is 50° F. higher than the above described preferred temperatures for liquid impregnated substrates. Thus, a preferred curing cycle for CVD type materials would include two hours at about 3150° F. followed by two hours at about 3350° F.

In applications where the substrate will be exposed to temperatures up to about 3000° F. but lower than 2500° F., an enhancement coating is applied to the primary coating. The combination of the primary coating and the enhancement coating results in a protective coating on the substrate that is effective in protecting the substrate from degradation and oxidation at temperatures between about −300° F. and 3000° F.

In accordance with one embodiment of the enhancement coating, the primary coating is I0 impregnated with tetraethyl orthosilicate. The tetraethyl orthosilicate is then heat cured on the primary coating thereby forming a silica coating. Thereafter, a mixture of an alkali silicate liquid and silicon carbide powder is applied to the surface and is then heat cured. Preferably, the tetraethyl orthosilicate is applied five times to the primary coating and heat cured after each application. Generally, the tetraethyl orthosilicate is cured at between 225° F. and 275° F. for between about 45 and 60 minutes after the tetraethyl orthosilicate solidifies, forming crystals.

Preferably, after the fifth impregnation, the part is heated between about 225° F. and 275° F. for about two hours after crystallization of the tetraethyl orthosilicate. Then, the part is cooled and reheated to between about 375° F. and 425° F. for between about 2 and 2.5 hours. Finally, the substrate is maintained at between about 565° F. and 625° F. for between about 6 and 7 hours.

After the primary coating has been impregnated with the tetraethyl orthosilicate and cured, a slurry of an alkali silicate liquid and silicon carbide powder is applied to the surface and heat cured. Alternatively, a mixture of water, sodium borate and sodium silicate can be substituted for the liquid alkali silicate. Preferably, for 100 ml. of water, the mixture includes 10 gm of sodium borate and 100 ml. of a sodium silicate solution containing 39% solids sold by Ridland's Mfg. Co. of Dallas, Tex. The slurry is applied to the surface using a brush, spatula or other type of applicator. Preferably, the area of the part that is being coated with the slurry is kept in a wet condition as the slurry is being applied. The excess slurry is wiped off using, for example, a cheesecloth material.

After application of the slurry to the part, it is dried and cured. Preferably, the drying procedure is accomplished under ambient conditions for a period of about sixteen hours. Thereafter, the slurry is heat cured. Preferably, curing takes place by maintaining a temperature of between about 185° F. and 225° F. for at least about two hours, thereafter increasing the temperature to between about 375° F. and 425° F. for at least about two hours and finally increasing the temperature to between about 575° F. and 625° F. for between about 4 and 7 hours.

A second application and heat treating of the slurry followed by an application of the liquid component of the slurry (for example alkali silicate liquid) heat cured in the same manner as the slurry applications completes the most preferred method for applying an enhancement coating to the primary coating of the present invention.

In accordance with a preferred embodiment of the enhancement coating, the slurry contains about 50 parts by weight of an alkali silicate liquid, most preferably the alkali silicate liquid sold under the tradename "Sermabond 487" by thee Sermetel Corporation of Limerick, Pennsylvania and about 50 parts by weight of a powder mixture containing equal amounts of black silicon carbide powder sold under the trade designation "RA 1200-black grit" by the Carborundum Company and graphite felt that has been converted to powdered silicon carbide felt. Preferably, the graphite felt utilized is "grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. Preferably, the packed graphite felt is heated between about 2950° F. and 3050° F. for about 5–6 hours. After the graphite felt has been converted to, Silicon carbide felt, the felt is powdered by any suitable method, such as a ball should have a small random fiber size. Preferably and will be of varied length, ranging between about several microns and about 0.01 inches.

In accordance With an alternate embodiment of the enhancement coating, a monoaluminum phosphate solution containing particulate alumina and silicon carbide is applied to the surface of the primary coating and is thereafter heat cured. Preferably, the liquid portion of the slurry contains about 55% by weight monoaluminum phosphate and about 45% by weight distilled water. The powder components of the slurry are preferably about 31.2% particulate silicon carbide by total weight of the powder components, preferably silicon carbide sold under the trade designation "RA 1200-black grit" by the Carborundum Company, about 31.3% of particulate silicon carbide converted felt by total weight of the powder components, about 32.8% particulate alumina by weight of the powder components, sold under the trade designation "T-61", and about 4.7% by weight particulate alumina sold under the trade designation "C-333" both from the Alcoa Corporation of Pittsburgh, Pa. The liquid and particulate components are combined in a ratio that is preferably about 1:1. The slurry can be applied using either a brush, spatula or other suitable instrument. The excess slurry is wiped off from the surface, preferably with a dry cheesecloth. The slurry applied to the surface is then heat cured. Preferably, after the slurry has been applied to the primary coating, it is dried at ambient temperatures for about 16 hours. Thereafter the slurry is cured by being maintained at about 200° F. for about two hours, then at about 400° F. for about two hours and finally at about 600° F. for about four hours. The curing is accomplished in an air oven and no special atmospheric requirements are necessary.

While the invention has been described with respect to preferred embodiments, it will be understood that the invention is capable of numerous rearrangements, modifications and alterations, and such rearrangements, modifications and alterations are intended to be within the scope of the appended claims.

For some types of substrates, it may be advantageous to pretreat the substrate prior to formation of the primary coating. In some cases, the primary coating is formed on the substrate more uniformly when the substrate is pretreated. Three types of pretreatment have been utilized. In accordance with one type of pretreatment, the substrate is impregnated with tetraethyl orthosilicate and cured. Preferably, the tetraethyl orthosilicate is applied five times in between each application and curing is accomplished by heating between about 225° F. and 275° F. for about thirty minutes after crystallization of the tetraethyl orthosilicate occurs. After the fifth impregnation, the substrate has any excess material removed therefrom and is then heat treated by heating at about 400° F. for about two hours and about 600° F. for four hours.

The second type of pretreatment is heat treatment. Generally, the substrate is heated in an inert atmosphere, preferably argon, at a temperature of about 3250° F. for about one hour.

The third type of pretreatment is a combination of heat treatment followed by treatment with tetraethyl orthosilicate, which can be accomplished as previously described.

Various advantages of the invention are apparent from the following examples:

EXAMPLE 1

A reinforced carbon-carbon composite substrate is coated in accordance with the present invention. The substrate was pretreated by impregnating five times with tetraethyl orthosilicate and curing after each time as set forth in the description of the preferred tetraethyl orthosilicate pretreatment. The primary coating was formed by utilizing a mixture of 35% silicon, 60% silicon carbide and 5% boron (by weight). Amorphous boron from the Kerr McGee Company having the tradename "Trona" was utilized. Silicon carbide having the trade designation "RA 1200-Green Grit" from the Carborundum Company was utilized and silicon having a particle size of about 325 Tyler standard screen scale was utilized.

The substrate was coated with a release agent comprising ash free filter paper and filter paper pulp mixed with "Methocel," a hydroxypropyl methyl cellulose from Dow Chemical Company. After the release agent was dried, the substrate was packed using the preferred amount of surface compaction.

After packing, the composition was dried under vacuum and the graphite retort containing the mixture and substrate was placed in the heating furnace and an Argon gas atmosphere. The retort was then heated to 2800° F. and thereafter heated at 3100° F. for two hours and finally at 3300° F. for two hours.

After the part was cooled and cleaned, an enhancement coating was applied to the primary coating. In forming the enhancement coating, the primary coating was impregnated five times with tetraethyl orthosilicate. The tetraethyl orthosilicate was heat cured after each application at between about 225° F. and 275° F. for between about 45 and 60 minutes after the tetraethyl orthosilicate solidified. After the fifth impregnation, the substrate was heated for about two hours at between about 225° F. and 275° F. after crystallization of the fifth application of the tetraethyl orthosilicate. The substrate was then cooled and reheated to about 400° F. for two hours and finally heated for four hours at about 600° F.

After the tetraethyl orthosilicate impregnation and curing, a slurry of an alkali silicate liquid ("Sermabond 487") and silicon carbide powder in a ratio of 1:1 was applied to the surface and heat cured. The silicon carbide was a 50:50 mixture of "RA 1200-black grit" silicon carbide from the Carborundum Company and graphite felt that had been converted to powder silicon carbide felt. "Grade WDF" graphite felt from Union Carbide was converted to silicon carbide felt by packing the felt in a mixture of silicon carbide, silicon and alumina and applying heat. After conversion, the felt was powdered to a small random fiber size.

After application of the coatings, the substrate was tested by subjecting it to air at 1000° F. for thirty hours. The substrate exhibited a net mass change of −0.0086 kg/m$^2$ of substrate surface area.

EXAMPLE 2

A substrate was coated as set forth in Example 1 and then tested by subjecting the substrate to air at 2450° F. for thirty hours. The substrate exhibited a net mass change of +0.017 kg/m$^2$ of substrate surface area. Substantially all of the mass change occurred in the first three hours of exposure.

EXAMPLE 3

A reinforced carbon-carbon composite substrate produced using chemical vapor deposition techniques is coated in accordance with the present invention. Other than ensuring that the surface to be coated was clean and dry, no special pretreatment was applied to the sample. The primary coating was formed by utilizing a mixture of 35% silicon, 60% silicon carbide and 5% boron (by weight). Amorphous boron from Kerr McGee Company having the tradename "Trona" was utilized, Silicon carbide having a trade designation "RA 1200-green grit" from the Carborundum Company was utilized and silicon having the particle size of about 325 Tyler standard screen scale was utilized.

The substrate was completely encased in a graphite felt release agent. The particular graphite felt used was WDF Graphite felt available from Union Carbide. The encased substrate was then packed in the above specified primary coating mixture and surface compaction was tested.

After packing, the composition was dried under a vacuum and the graphite retort containing the mixture and substrate was placed in a heating furnace under an Argon gas atmosphere. The retort was heated to 2800° F., thereafter to 3150° F. for two hours, and finally to 3350° F. for two hours.

After the part was cooled and cleaned, an enhancement coating was applied through application of five impregnation/heat cure cycles using tetraethyl orthosilicate followed by two applications of the liquid alkali silicate—silicon carbide slurry described in Example 1 (using the heat cure treatment there described) followed by a final application of "Sermabond 487" liquid sealant which was cured in the same manner as the slurry mixture.

After application of the primary and enhancement coatings, the sample was tested for resistance to oxidation by subjecting it to a temperature of 2450° F. in air for a period of thirty hours. At the end of the test the sample not only did not exhibit any loss of mass but rather indicated a net mass change of +0.0002 gm/cm$^2$.

While the invention has been described with respect to preferred embodiments, it will be understood that the invention is capable of numerous rearrangements, modifications and alterations and such rearrangements, modifications and alterations are intended to be within the scope of the appended claims.

I claim:

1. A method for protecting a substrate of reinforced carbon-carbon composite material, produced using chemical vapor deposition techniques, from degradation due to exposure to oxygen at elevated temperatures, said method comprising:

(a) forming an essentially uniform mixture of particulate silicon present in an amount of between about 25 and 40% by weight of the total mixture, particulate silicon carbide present in an amount of between about 50 and 70% by weight of the total mixture, particulate boron present in an amount of between about 1 and 15% by weight of the total mixture, and a minor amount of magnesium;

(b) encasing said substrate with a release agent;

(c) contacting the encased substrate with said mixture; and (d) thereafter heat treating said mixture and said encased substrate to a temperature of about 3150° F. for approximately two hours and then raising the temperature to about 3350° F. for two hours to form a primary coating on the surface of the substrate.

2. The method of claim 1 wherein said release agent is graphite felt.

3. The method of claim 1 wherein said release agent comprises ash free filter paper.

4. The method of claim 1 wherein said mixture contains about 60% by weight particulate silicon carbide, about 35% by weight particulate silicon, and about 5% by weight particulate boron, said particulate boron containing a minor amount of magnesium.

5. The method of claim 1 wherein the mixture and the encased substrate are contained within a graphite retort during the heating of said mixture and encased substrate in step (d).

6. The method of claim 1 further comprising forming, after the formation of said primary coating, an enhancement coating for sealing the primary coating.

7. The method of claim 6 wherein the enhancement coating is formed using a method comprising:

(a) impregnating the primary coating with tetraethyl orthosilicate;

(b) heat curing the tetraethyl orthosilicate impregnated in said primary coating;

(c) thereafter applying a mixture of a liquid alkali silicate and particulate silicon carbide to the primary coating; and (d) curing the alkali silicate and silicon carbide mixture applied to the primary coating.

8. The method of claim 7 wherein the method for forming said enhancement coating further comprises applying liquid alkali silicate to the primary coating containing the thus cured alkali silicate and silicon carbide mixture, and heat curing the thus applied liquid alkali silicate.

9. A method for protecting a surface of a substrate formed of reinforced carbon-carbon composite materials, produced using chemical vapor deposition techniques, from degradation due to exposure to oxygen, said method comprising covering the surface of said substrate which is to be protected with a mixture of:

(a) between about 25 and 40% particulate silicon by weight of the total mixture;

(b) between about 50 and 70% particulate silicon carbide by weight of the total mixture;

(c) between about 1 and 15% particulate boron by weight of the total mixture; and (d) a minor amount of particulate magnesium for facilitating formation of a coating.

10. The method of claim 9 wherein said particulate silicon carbide is present in said mixture in an amount of about 60% by weight of the total mixture, said particulate silicon is present in said mixture in an amount of about 35% by weight of the total mixture, and said particulate boron is present in said mixture in an amount of about 5% by weight of the total mixture.

11. The method of claim 9 further comprising forming on the thus covered substrate surface an enhancement coating.

12. A coated substrate resistant to degradation due to exposure to oxygen at elevated temperatures comprising:

(a) a reinforced carbon-carbon composite material, produced using chemical vapor deposition techniques, as the substrate; and (b) a coating deposited on the surface of said substrate desired to be protected, said coating being formed from a mixture comprising between about 25 and 40% by weight particulate silicon, between about 50 and 70% by weight particulate silicon carbide, between about 1 and 15% by weight particulate boron, and a minor amount of magnesium for facilitating formation of the coating, said percentages being based on the weight of the mixture.

13. The coated substrate of claim 12 wherein said mixture comprises about 60% by weight particulate silicon carbide, about 35% by weight particulate silicon, and about 5% by weight particulate boron.

14. The coated substrate of claim 12 or 13 wherein the magnesium is an impurity present in the particulate boron.

15. The coated substrate of claim 14 wherein said magnesium is present in the mixture in an amount of from about 2 to about 8% by weight of the boron in said mixture.

16. The coated substrate of claim 12 wherein said coating is a primary coating, and wherein said coated substrate further comprises an enhancement coating.

17. The coated substrate of claim 16 wherein said enhancement coating is formed by a process comprising the steps of:

(a) impregnating the primary coating with tetraethyl orthosilicate;

(b) heat curing the tetraethyl orthosilicate impregnated in the primary coating;

(c) evenly applying a sealant mixture of a liquid alkali silicate and particulate silicon carbide to the primary coating containing the heat cured tetraethyl orthosilicate;

(d) heat curing the thus applied sealant mixture;

(e) evenly applying a liquid alkali silicate sealant to the primary coating containing the heat cured sealant mixture; and (f) heat curing the thus applied liquid alkali silicate sealant.

* * * * *